(12) United States Patent
Cass

(10) Patent No.: US 6,868,937 B2
(45) Date of Patent: Mar. 22, 2005

(54) SUB-WOOFER SYSTEM FOR USE IN VEHICLE

(75) Inventor: Glenn Cass, Lomita, CA (US)

(73) Assignee: Alpine Electronics, Inc, Tokyo (JP)

(*) Notice: Subject to any disclaimer, the term of this patent is extended or adjusted under 35 U.S.C. 154(b) by 40 days.

(21) Appl. No.: 10/106,651

(22) Filed: Mar. 26, 2002

(65) Prior Publication Data

US 2003/0183444 A1 Oct. 2, 2003

(51) Int. Cl.$^7$ .............................................. G10K 11/00
(52) U.S. Cl. ...................................................... 181/192
(58) Field of Search ................................ 181/192, 196, 181/148–156, 141; 381/86

(56) References Cited

U.S. PATENT DOCUMENTS

| | | | | |
|---|---|---|---|---|
| 3,276,538 A | * | 10/1966 | Guyton et al. ............... | 181/141 |
| 3,882,962 A | * | 5/1975 | Ripple ......................... | 181/154 |
| 4,085,289 A | * | 4/1978 | Schmideler ................... | 381/86 |
| 4,369,857 A | * | 1/1983 | Frazer et al. ................. | 181/159 |
| 4,567,959 A | * | 2/1986 | Prophit ........................ | 181/156 |
| 4,924,962 A | * | 5/1990 | Terai et al. .................. | 181/141 |
| 5,170,435 A | * | 12/1992 | Rosen et al. .................. | 381/86 |
| 5,193,118 A | * | 3/1993 | Latham-Brown et al. ...... | 381/86 |
| 5,218,175 A | * | 6/1993 | Scarlata ....................... | 181/141 |
| 5,287,412 A | * | 2/1994 | Etzel et al. ................... | 381/86 |
| 5,468,922 A | * | 11/1995 | Hanba .......................... | 181/150 |
| 5,646,381 A | * | 7/1997 | Boyte, Jr. .................... | 181/141 |
| 5,687,246 A | * | 11/1997 | Lancon ........................ | 381/386 |
| 5,841,877 A | * | 11/1998 | Mihara ........................ | 381/86 |
| 6,076,631 A | * | 6/2000 | Hoenninger et al. ......... | 181/141 |
| 6,310,958 B1 | * | 10/2001 | Eisner ........................... | 381/86 |
| 6,389,147 B1 | * | 5/2002 | Rush et al. .................. | 381/389 |

\* cited by examiner

Primary Examiner—Marlon T. Fletcher
Assistant Examiner—David S. Warren
(74) Attorney, Agent, or Firm—Muramatsu & Associates

(57) ABSTRACT

A sub-woofer system with a flat horn for use in a vehicle which is capable of achieving an improved sound reproducing performance as well as an excellent space factor by mounting the horn on the floor of the vehicle. The sub-woofer system includes a flat horn having a proximal end and a distal end where the proximal end is connected to a drive unit. The flat horn has a rectangular cross-section and is substantially uniform in thickness throughout while gradually increases in width toward the distal end. The drive unit is positioned under a front seat of the vehicle and the flat horn is placed on a floor of the vehicle, and wherein an end opening of the flat horn at the distal end thereof is positioned close to an inner front wall of the vehicle so that at least a part of the distal end contacts with the front wall.

10 Claims, 11 Drawing Sheets

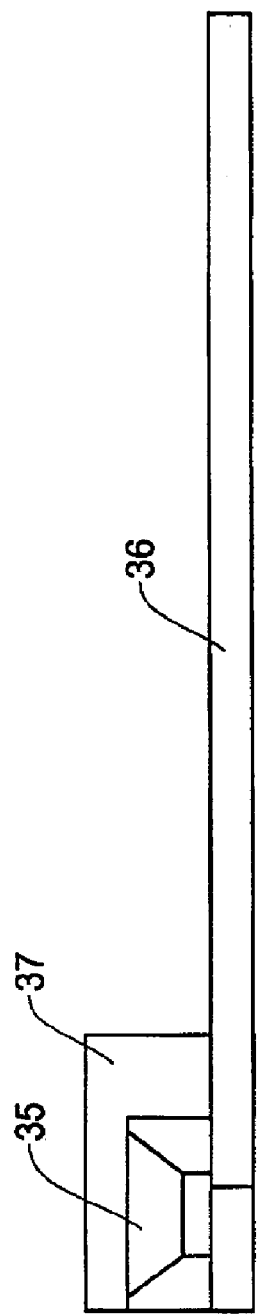
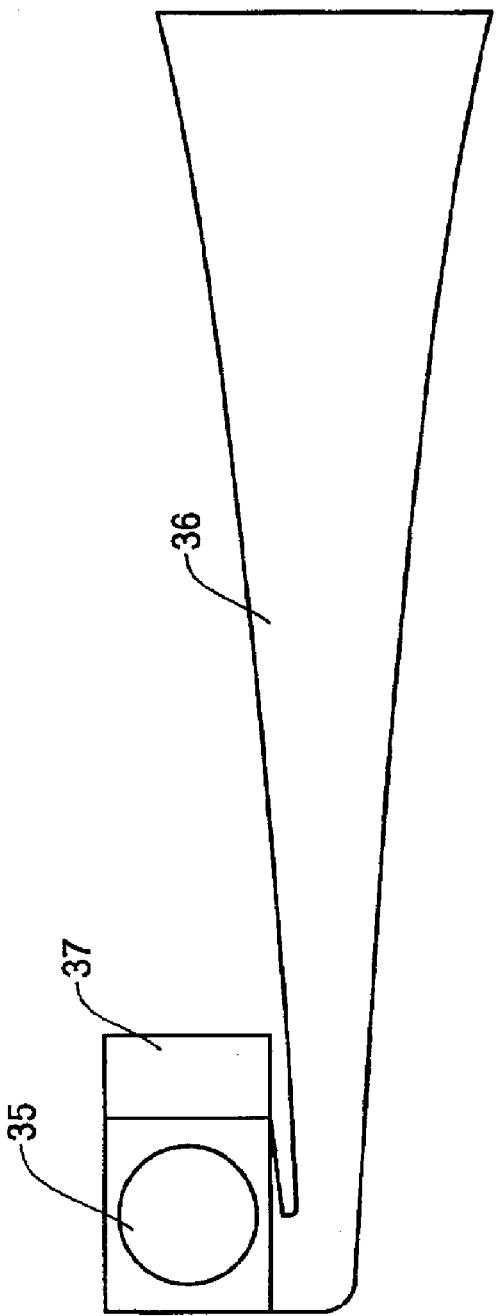
Fig. 11A
Fig. 11B

SUB-WOOFER SYSTEM FOR USE IN VEHICLE

FIELD OF THE INVENTION

This invention relates to a low frequency and high power speaker (sub-woofer), and more particularly, to a sub-woofer system with a flat-shaped horn for use in a vehicle which is capable of achieving an improved sound reproducing performance as well as an excellent space factor by mounting the horn on the floor of the vehicle.

BACKGROUND OF THE INVENTION

Modern vehicles are equipped with sophisticated electronic devices such as multimedia entertainment systems, GPS navigation systems, and the like. In such electronic devices, sound reproducing apparatuses such as compact disk players have been improved in performance, and there is an increasing demand for expansion of the sound range to reproduce very low frequency range sound with high power and high reproduction quality in the passenger compartment of a vehicle. Typically, such a low frequency range extends from about 25 Hz to about 100 Hz.

U.S. Pat. No. 4,924,962 discloses a sound reproducing apparatus for use in vehicle which includes at least one acoustic duct and a speaker unit disposed at a throat of the acoustic duct. An opening formed at other end of the acoustic duct faces the passenger compartment of the vehicle. The sound reproducing apparatus is designed to make the sound pressure frequency response curve relatively flat without increasing the level of distortion in the lower frequency range. Typically, the sound reproducing apparatus is mounted on the rear tray of the vehicle of a type so called a hatch-back car or station wagon which is constructed without any closed rear trunk.

Since the loudspeaker and the acoustic duct are mounted on the rear tray of the vehicle, an almost entire space in the rear tray is consumed by the sound reproducing apparatus, resulting in a poor space factor. Further, as will be explained later with reference to FIG. 2, when the sound source is provided at the rear tray or deck, the sound wave propagated to the front is reflected back to the rear because the material at the front wall (dash board, etc.) is hard, thereby causing a standing wave problem. Moreover, to achieve a sufficient sound volume for the front seat passenger, the rear seat passenger tends to be overwhelmed by the excessive sound volume.

U.S. Pat. No. 5,218,175 discloses a vehicle loudspeaker system which includes at least one elongated conduit having a proximal portion and a distal portion. A loudspeaker driver is disposed in a vehicle trunk and is attached to the proximal portion of the conduit. The loudspeaker driver has a vibration surface for generating sound pressure waves in response to electrical signals. The proximal portion of the elongated conduit is open to the passenger compartment. The elongated conduit has an effective length corresponding to a quarter wavelength of the lowest frequency of sound pressure waves. Typically, the proximal end of the conduit reach the front of the rear seat in the passenger compartment.

As will be explained later with reference to FIGS. 1 and 2, when the sound source is mounted under the rear seat, the vehicle loudspeaker system involves the standing wave problem and a rear reflection problem, although the degree of such problems is lower than that of the rear tray mounting as above. Further, since the proximal end of the elongated conduit reach the front of the rear seat, the sound quality will change depending upon the passenger's foot position or any articles placed on the floor.

SUMMARY OF THE INVENTION

It is, therefore, an object of the present invention to provide a sub-woofer system equipped with a flat shaped horn for use in a vehicle which is capable of achieving improved sound reproducing performance by mounting on the floor of the vehicle.

It is another object of the present invention to provide a sub-woofer system having a flat horn for use in a vehicle which is capable of effectively using a space of the vehicle by laying the flat horn on the floor of the vehicle.

It is a further object of the present invention to provide a sub-woofer system having a flat shaped horn for use in a vehicle where the flat horn is attached to a floor mat of the vehicle for easy installation in the vehicle.

It is a further object of the present invention to provide a sub-woofer with a flat shaped horn for use in a vehicle where the flat horn is formed as a part of the floor chassis of the vehicle.

To this end, the sub-woofer system of the present invention is configured by a drive unit for producing sound in response to an electric signal and a flat horn having a proximal end and a distal end where the proximal end is connected to the drive unit for guiding the sound produced by the drive unit. The flat horn has a rectangular cross-section and is substantially uniform in thickness throughout while gradually increases in width toward the distal. The drive unit is positioned under a front seat of the vehicle and the flat horn is placed on a floor of the vehicle, and wherein an end opening of the flat horn at the distal end thereof is positioned at a fire wall positioned at the front of a passenger compartment of the vehicle to exhaust the sound from the drive unit.

Preferably, the distal end of the flat horn is curved or bent upwardly to run along the fire wall of the vehicle, thereby positioning the end opening thereof immediately below a dash board of the vehicle. Alternatively, the distal end of the flat horn is straight, thereby positioning the end opening thereof at about a bottom of the fire wall of the vehicle. The flat horn has an upwardly curved portion in an intermediate portion thereof to match a transversal pillar of the vehicle.

The sub-woofer system can be formed with use of the chassis of the vehicle. For example, at least a bottom plate of the flat horn can be established by a chassis of the vehicle. Alternatively, the flat horn is integrally formed by the chassis of the vehicle.

The flat horn is attached to a floor carpet of the vehicle through an adhesive where the end opening of the flat horn and an end edge of the floor carpet are flush with one another. Alternatively, the flat horn is integrally formed with a floor carpet of the vehicle where the end opening of the flat horn and an end edge of the floor carpet are flush with one another. A spacer is provided on the floor carpet to maintain the same thickness of the floor carpet when installed in the vehicle.

According to the present invention, the sub-woofer system for a vehicle is capable of achieving improved sound reproducing performance by introducing the sound output at the fire wall of the vehicle while mounting the flat horn on the floor. Because the drive unit is located under the front seat and the flat horn is placed on the floor under the carpet, the sub-woofer system is established without sacrificing any space in the vehicle. In the sub-woofer system of the present invention, the flat horn can be prefabricated with a floor mat of the vehicle for easy installation in the vehicle. Further, the flat horn of the sub-woofer system can be formed as a part of the floor chassis of the vehicle.

BRIEF DESCRIPTION OF THE DRAWINGS

FIG. 11A is a side view showing another example of a sub-woofer system of the present invention and FIG. 11B is a top view of the sub-woofer system of FIG. 11A.

FIG. 13A is a cross sectional view of the floor mat and FIG. 13B is a bottom view thereof.

DETAILED DESCRIPTION OF THE INVENTION

The present invention will be described below with respect to preferred embodiments thereof with reference to the accompanying drawings.

Figure 1:
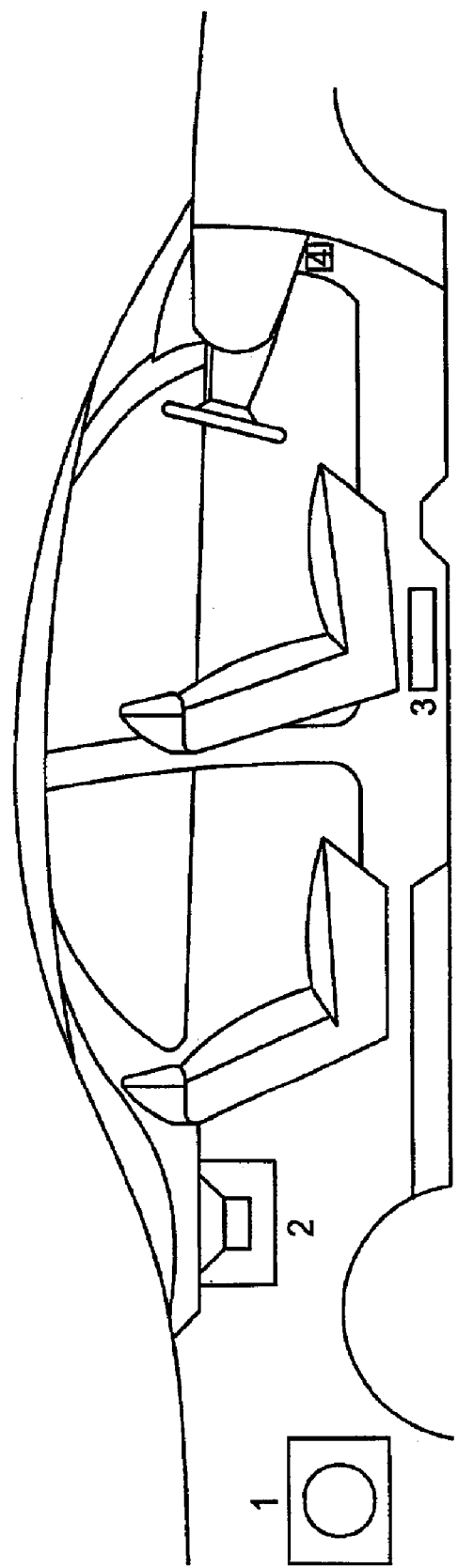
FIG. 1 is a schematic side view of a vehicle showing a variety of positions in the vehicle for mounting the loudspeaker for evaluating acoustic performance.

FIG. 1 is a side view of a vehicle illustrating possible locations for mounting a low frequency range loudspeaker (sub-woofer). Typically, the low frequency extends from about 25 Hz to about 100 Hz. The inventor has studied the acoustic performance of the sub-woofer when mounted at the locations 1–4 of FIG. 1. FIGS. 2A–2C and 3A–3E show sound waveforms involving a standing wave problem and a rear reflection problem when the sub-woofer is mounted in the vehicle. FIGS. 4–7 show frequency response curves of the sound waves when the sub-woofer is mounted at the locations 1–4 of FIG. 1, respectively.

In FIG. 1, the location 1 is a trunk where the vibration of the sub-woofer is transmitted to the passenger compartment through he rear seats of the vehicle. Since the sound has to come through the rear seat, it results in a damped performance or "Muddy Sound". The sound waves from the trunk will blend with sound waves of the main system, for example, at the front door. As will be described later with reference to FIGS. 2A–2C, the standing wave problem will arise by a sound wave reflected from the front of the vehicle.

As will be described later with reference to FIGS. 2A–2C, the standing wave problem will arise because of the wave reflected from the front of the vehicle. In the location 1, to attain a good performance in the front seat, rear seat passengers will be overwhelmed. A localization problem also arises in the trunk mounting where the sound is heard from a specific point or points in the vehicle. The objective of any quality sound system is to create a sound that is transparent or seamless, i.e., one could not point to any given speaker in the system. In all, the trunk mounting is the worst of all locations shown in FIG. 1.

The location 2 is a rear deck with or without enclosure. Without enclosure, the loss of bass sound is significant due to the poor baffling. With or without enclosure, energy loss will arise because of the rear deck and rear seat. Similar to the location 1, the standing wave problem will arise by a sound wave reflected from the front of the vehicle. The sound wave is easily localized, i.e., it involves the localization problem. Further, as will be described later with reference to FIGS. 3A–3E, the rear reflection problem will arise where the wave reflected from the rear cancels sound waves with a specific phase. To attain a good performance in the front seat, rear seat passengers will be overwhelmed by the excessive sound volume.

The location 3 is a space under the front seat. This location requires a minimal space and shows a performance better than the locations 1 or 2. The localization problem is not found in this location, i.e., the sound energy is distributed evenly without focused sound. However, because the sound wave is scattered in all directions (no loading assistance from vehicle), a reduction in the sound pressure level (SPL) results. Moreover, although less serious than that of the locations 1 and 2, the under seat mounting still involves the standing wave problem and the rear reflection problem noted above.

The location 4 is a fire wall (under dashboard) at the front of the vehicle. This mounting location shows the best performance. There is no standing wave problem since the sound wave reflected from the back is very small because the reflective back wall (rear seat) is soft. The sound is distributed evenly throughout the vehicle without localization. Since the sub-woofer is close to the main system (front door), perfect transition between the main system and sub-woofer is available, creating a transparent sound stage. Accordingly, the inventor has developed the unique sub-woofer system which is able to achieve the mounting method equivalent to the location 4. It should be noted that the term fire wall is used to indicate a wall or wall like structure positioned in front of a passenger compartment as normally arranged in a vehicle to conform to a conventional terminology. Further, the passenger compartment indicates an inner space of a vehicle including a rear seat area as well as a front seat area.

Before going into the details of the sub-woofer system of the present invention, descriptions will be made regarding the standing wave problem and the rear reflection problem noted above with reference to FIGS. 2A–2C and 3A–3E. The standing wave causes an amplitude dip and/or peak in the frequency response curve of the sub-woofer system. The rear reflection problem causes cancellation of certain phases of the sound wave which also appears as an amplitude dip in the frequency response curve.

Figure 2:
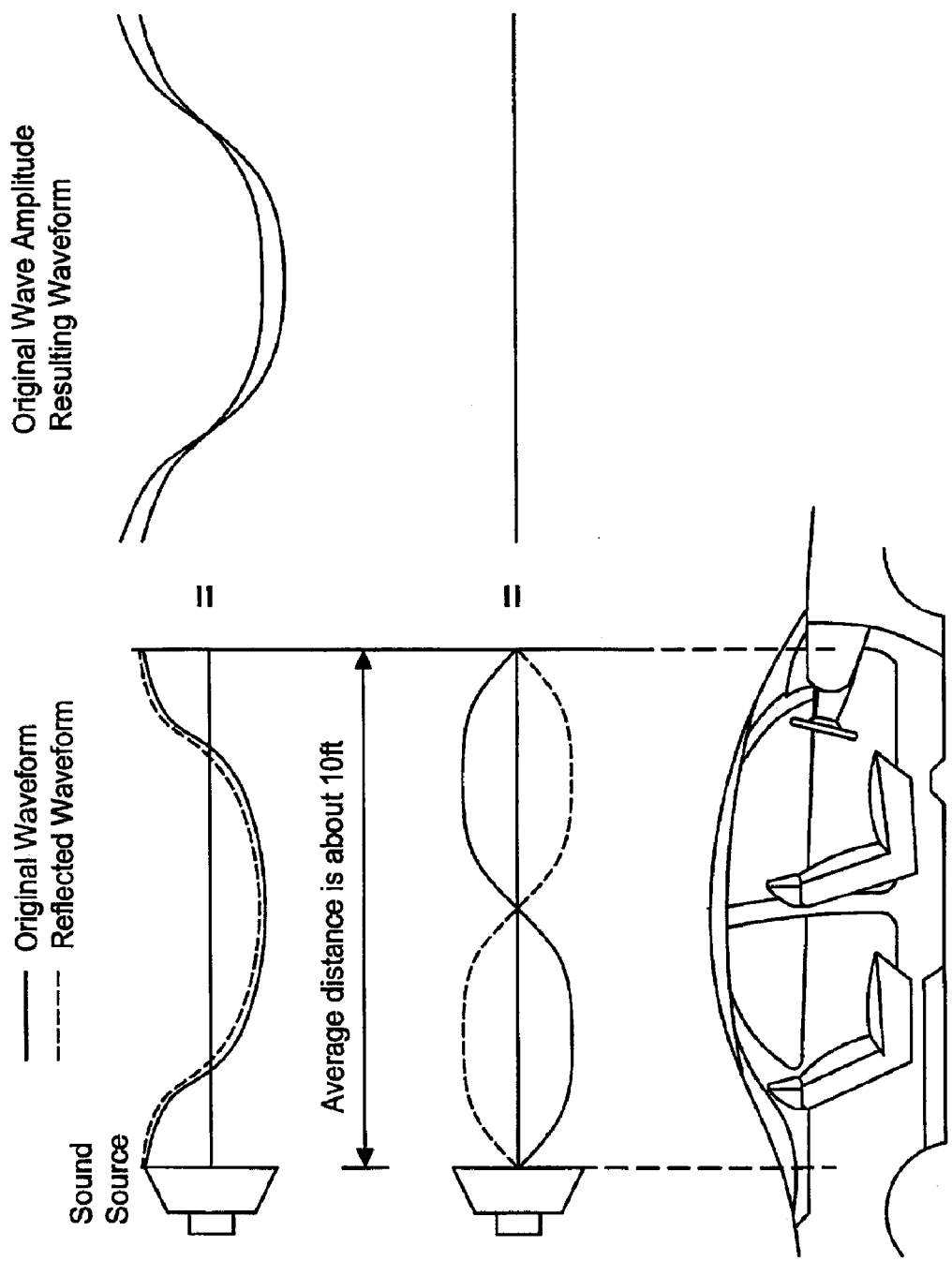
FIGS. 2A–2C are waveform diagrams explaining a problem associated with a standing wave of a sound wave when the loudspeaker is mounted at the rear of the vehicle.

FIGS. 2A–2C are waveform diagrams explaining the standing wave problem associated with the inner size of the vehicle. Especially when the loudspeaker (sound source) is mounted on the trunk or rear deck, as the locations 1 and 2 in FIG. 1, the sound wave from the rear to the front is reflected back to the rear because the structure at the front of the vehicle is hard. Depending on the phase (frequency) of the sound wave, the amplitude of the transmitted sound wave will be either decreased or increased by the reflected sound wave. Typically, standing waves occur at multiples of ½ wavelength of a sound wave beginning at ½ wave. Since the speed of sound is 1,132 feet per second and a typical interior length (FIG. 2C) of a vehicle is 10 feet, the first standing wave problem occur at about 56 Hz.

In the example of FIG. 2A, when the phase of the original wave (solid line) and the phase of the reflected wave (dotted line) match one another, the amplitude of the sound wave at this particular frequency increases as shown in the right side of FIG. 2A. Conversely, in the example of FIG. 2B, the phase of the original wave (solid line) is opposite to one another, i.e., 180° different from the phase of the reflected wave (dotted line). Thus, by combining the opposite amplitudes of both of the sound waves at this particular frequency, the overall sound wave is decreased (i.e., canceled) in the amplitude as shown in the right side of FIG. 2B.

FIGS. 3A–3E are waveform diagrams explaining a problem associated with a rear reflection of a sound wave when the loudspeaker is mounted, for example, in the trunk of the vehicle. FIGS. 3A–3E show such a situation where each drawing shows the situation in which the phase is apart by ¼ wavelength from the previous situation. The solid line shows the original sound wave while the dotted line shows the reflected sound wave. When the distance X between the rear (reflective surface) of the vehicle and the sound source is about a quarter (¼) wavelength of the sound wave generated by the loudspeaker, the sound wave reflected from the rear (such as a rear wall of the trunk) cancels a portion of the sound wave generated by the sound source.

Figure 3:
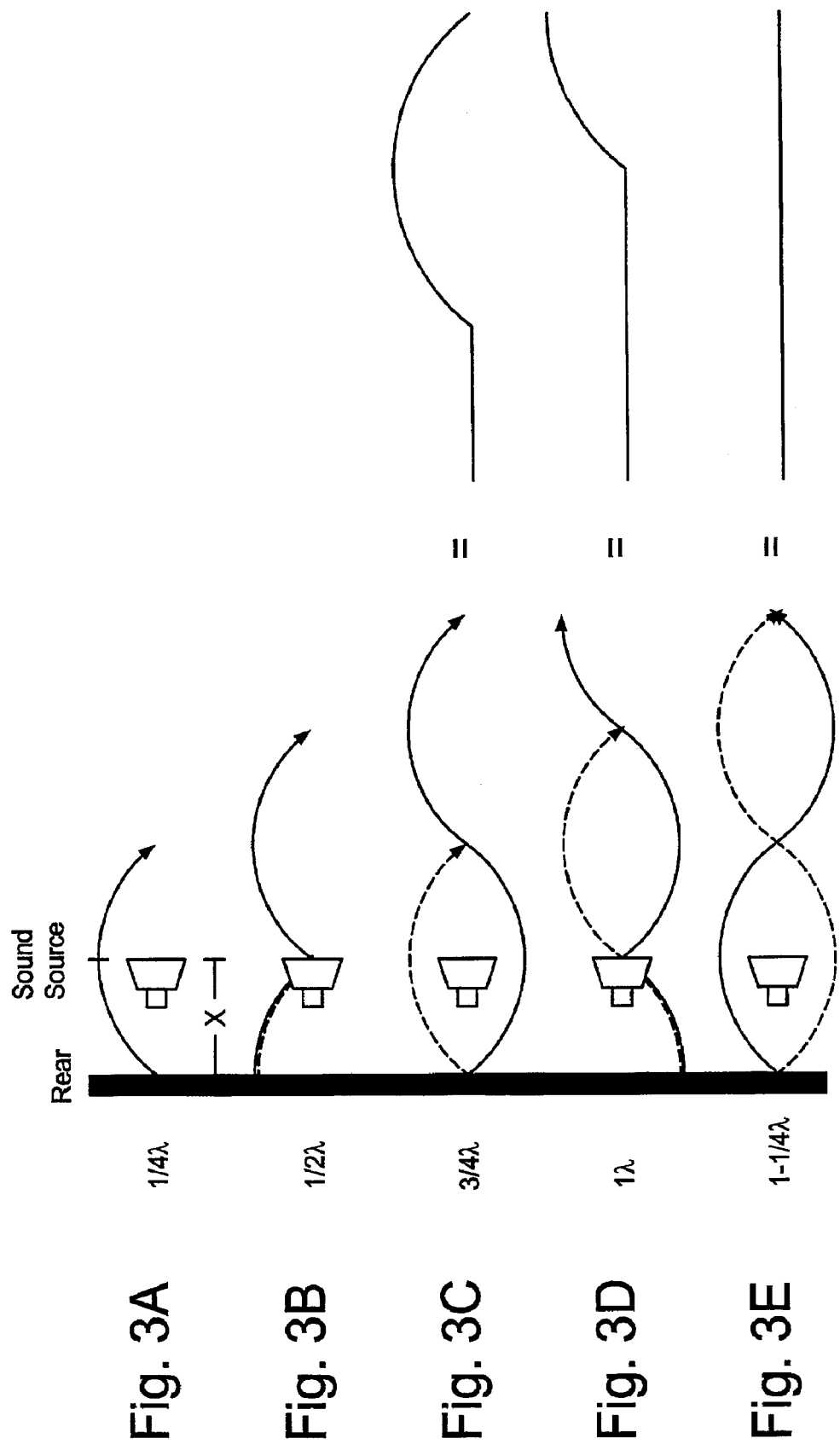
FIGS. 3A–3E are waveform diagrams explaining a problem associated with a rear reflection of a sound wave when the loudspeaker is mounted in the vehicle.

At the first ¼ wave, in FIG. 3A, the sound wave propagated toward the both directions show no reflection. In FIG. 3B, in the first ½ wave, the sound waves in the rear direction are overlapped while the sound wave in the forward direction is not affected. In FIG. 3C, the first ½ wave is canceled by the rear reflected sound wave. Similarly, in FIG. 3D, the ¾ wave is canceled by the rear reflected wave, and in FIG. 3D, the full cycle of the wave is canceled by the reflected sound wave.

Figure 4:
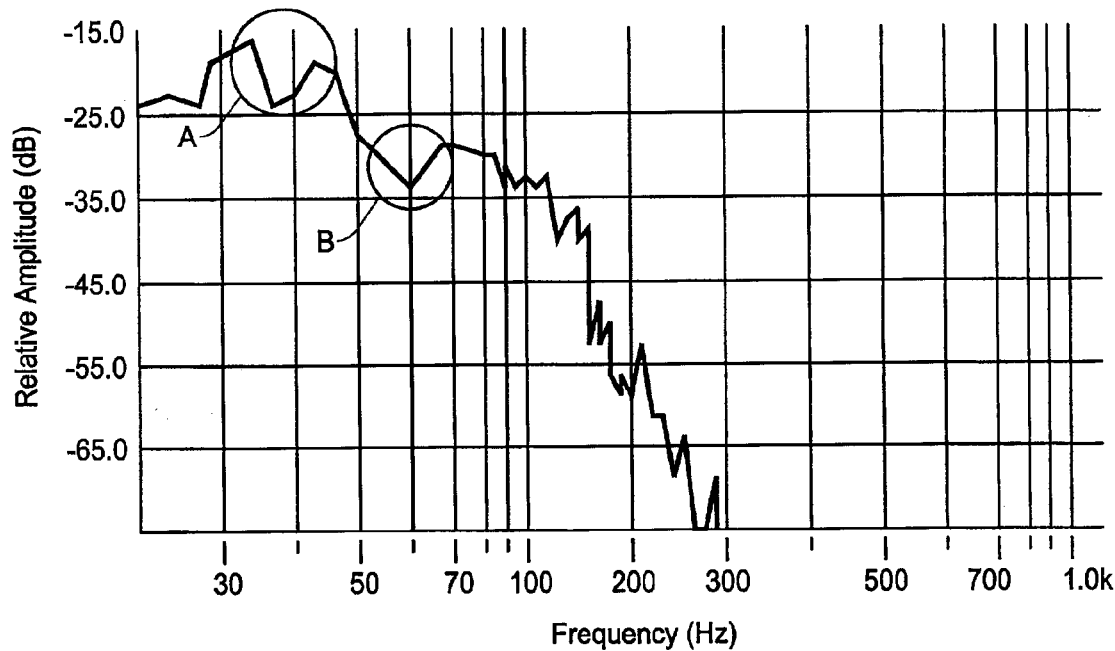
FIG. 4 is a characteristic diagram showing a frequency response curve of a sub-woofer system when the sub-woofer is mounted at the location 1 of FIG. 1.
Figure 5:
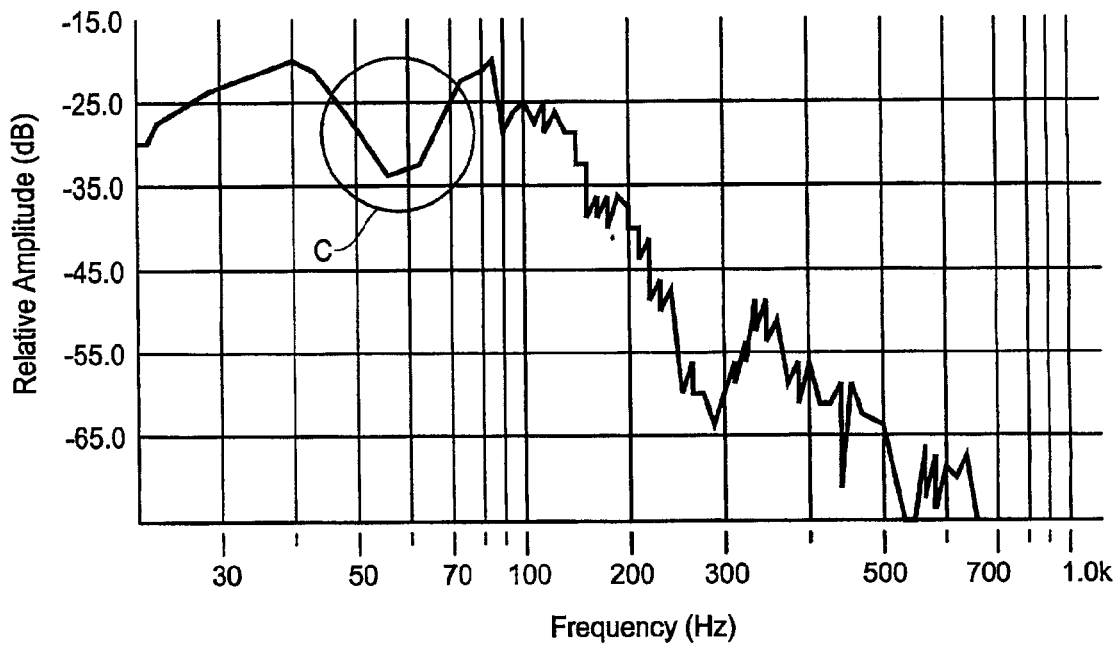
FIG. 5 is a characteristic diagram showing a frequency response curve of a sub-woofer system when the sub-woofer is mounted at the location 2 of FIG. 1.

Consequently, with respect to the mounting location 1 (trunk) of FIG. 1, the resultant frequency response curve of FIG. 4 shows a peak A at around 35 Hz and a dip B at around 60 Hz produced by the standing wave noted above. The reduced amplitude in the upper region (50 Hz–100 Hz) is caused by the damping of the rear seat. When the sub-woofer is mounted at the location 2 (rear deck) of FIG. 1, the frequency response curve of FIG. 5 also shows a dip C at around 60 Hz. The position of the dip C is almost the same as that of the dip B in FIG. 4 which is determined by the interior length of the vehicle as noted above.

Figure 6:
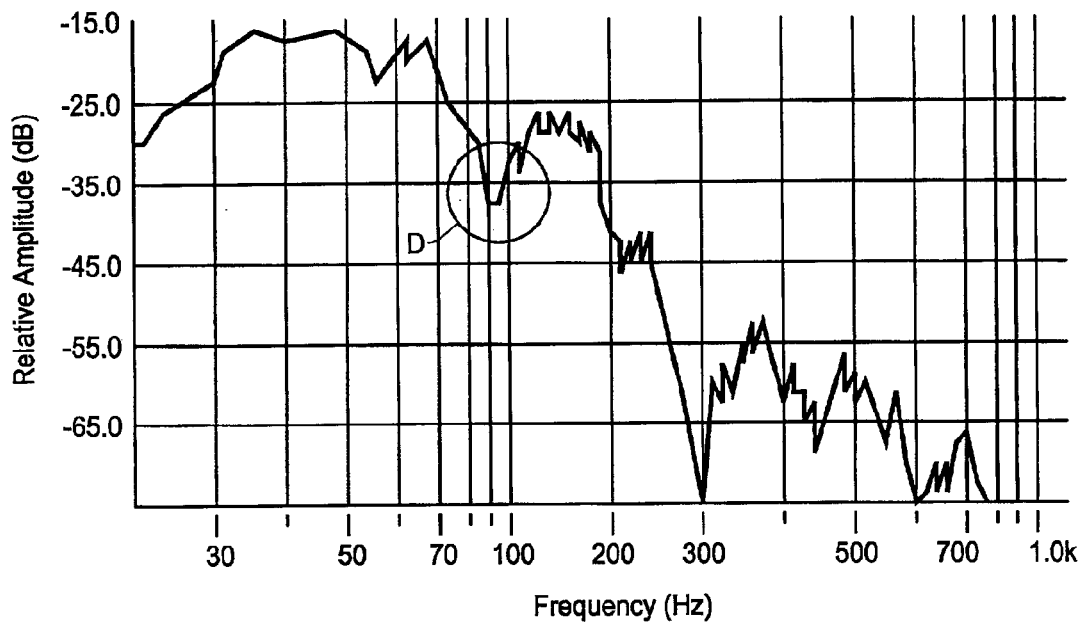
FIG. 6 is a characteristic diagram showing a frequency response curve of a sub-woofer system when the sub-woofer is mounted at the location 3 of FIG. 1.

When the sub-woofer is mounted at the location 3 (under the seat) of FIG. 1, the resultant frequency response curve is shown in FIG. 6. This curve shows a performance better than that of FIGS. 4 and 5. However, as noted above, there still is a dip D in the frequency response at about 90 Hz and a peak at about 150 Hz due to standing wave. Because the sound wave is scattered in all directions (no loading assistance from vehicle), a reduction in the sound pressure level CSPL) in 30–60 Hz results.

Figure 7:
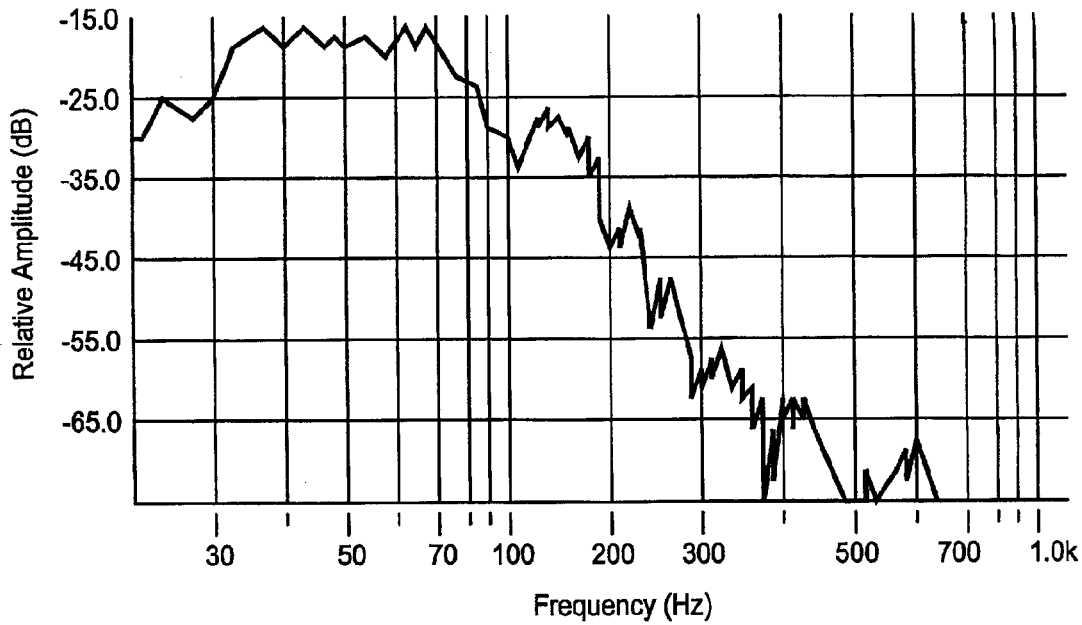
FIG. 7 is a characteristic diagram showing a frequency response curve of a sub-woofer system when the sub-woofer is mounted at the location 4 of FIG. 1.

FIG. 7 shows the frequency response curve when the sub-woofer is mounted at the location 4 (fire wall) of FIG. 1. The frequency response curve does not show any peak or dip in the frequency range 25–100 Hz. Since the vehicle provides a loading assistance, i.e., the fire wall guides the sound waves in substantially one direction, this mounting method achieves the highest sound pressure level (SPL). The frequency response curve shows a smooth roll off after cross over point at 80 Hz.

Accordingly, as noted above, the sub-woofer system of the present invention is to realize the mounting location 1 of FIG. 1 while maintaining the same or substantially the same inner structure and spacing of the vehicle. In the present invention, the sub-woofer system includes a flat horn which has a rectangular cross-section and runs on the floor of the vehicle. The end opening of the flat horn is positioned at the fire wall (front wall of the passenger compartment) of the vehicle at under the dash board.

Figure 8:
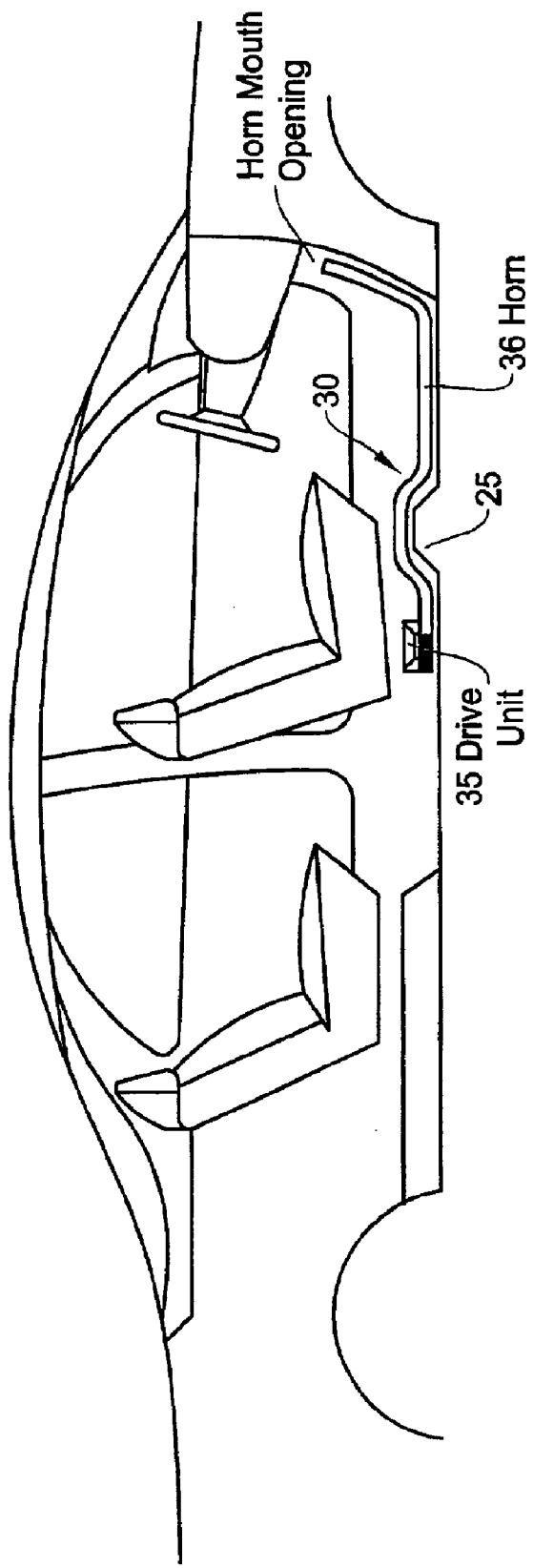
FIG. 8 is a schematic diagram showing a sub-woofer with a flat horn mounted on the floor of the vehicle in the present invention where the opening of the horn is at the location 1 of FIG. 1.

FIG. 8 shows a side view of an embodiment of the present invention where a sub-woofer system 30 is mounted on the floor of the front passenger compartment. The sub-woofer system has a drive unit (loudspeaker) 35 and a flat horn 36. The drive unit 35 and one end of the flat horn 36 are connected while the other end of the flat horn 36 extends toward the fire wall of the vehicle. The flat horn 36 has a rectangular shape in cross section and can be made of almost any material, such as wood, plastic, metal and the like. A floor mat will cover the flat horn 36 except for the end opening thereof, which makes the sub-woofer system almost invisible for passengers.

Figure 9:
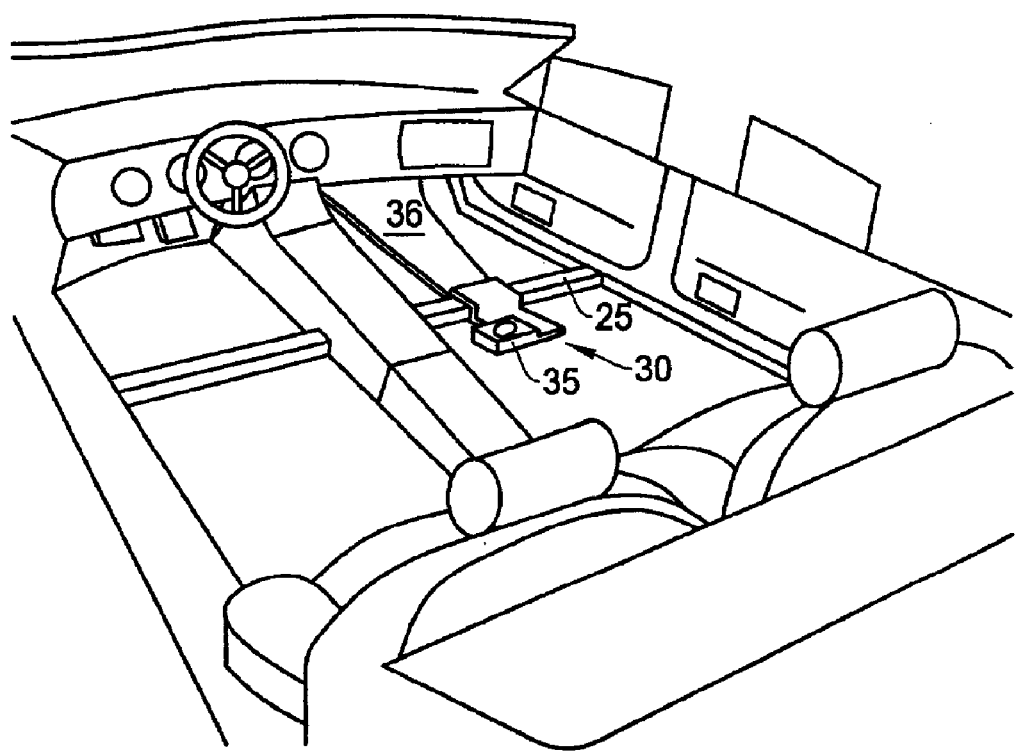
FIG. 9 is a perspective view of the sub-woofer with flat horn in the present invention where the opening of the horn is located at the fire wall of the vehicle.

FIG. 9 is a perspective view of the embodiment of FIG. 8 which shows a top view of the sub-woofer system. The sub-woofer system 30 will be mounted on the floor of the vehicle through attachment means such as screws. Although not shown, preferably, reinforcement ribs and frames will be provided in an inner area of the flat horn. As shown in FIG. 9, the flat horn 36 increases its width toward the fire wall (under dash board) of the vehicle in top view. In this example, the end portion of the flat horn 36 is bent or curved upwardly along the fire wall.

Typically, a vehicle has a pillar 25 under the front seat area for structural enforcement. Accordingly, the flat horn 36 is curved or bent in the intermediate portion to match the pillar 25 of the vehicle. Such a curve or bent in the intermediate portion is also effective in preventing debris or fluid from coming to the drive unit 35. In the case where the vehicle has no such a transversal pillar, the middle portion of the horn 36 can be formed straight.

In the sub-woofer system of the present invention, it is unnecessary to mount the loudspeaker on the fire wall of the vehicle. The loudspeaker is mounted under the front seat and the flat horn is extended on the floor under the carpet and the opening is reached to the fire wall. The end portion of the horn 36 is curved so that the end opening thereof is positioned immediately below the dash board. Thus, the sub-woofer system fits along the floor and the fire wall of the vehicle without any projection in the passenger compartment. Since the horn 36 is mounted close to the main system, which is typically implemented by the front door speakers, perfect transition between the main system and sub-woofer is available, creating a transparent sound stage.

Figure 10A:
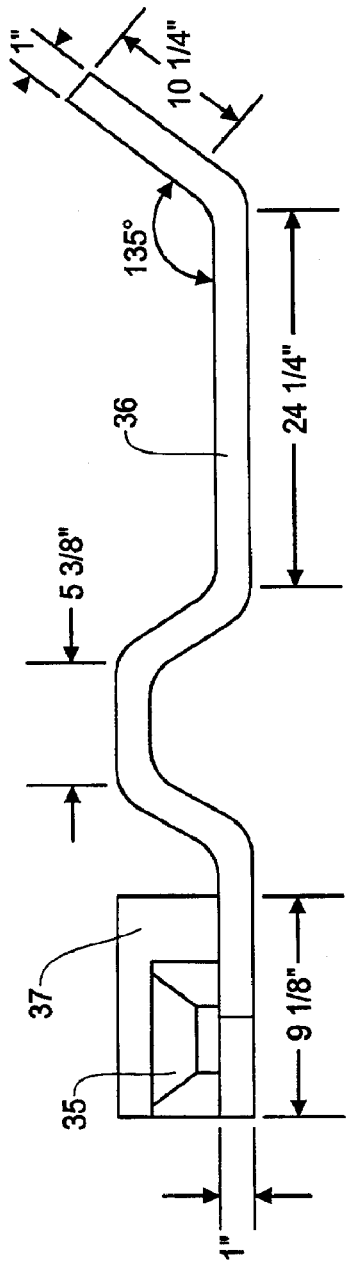
FIG. 10A is a side view showing an example of a sub-woofer system of the present invention and FIG. 10B is a top view of the sub-woofer system of FIG. 10A.
Figure 10B:
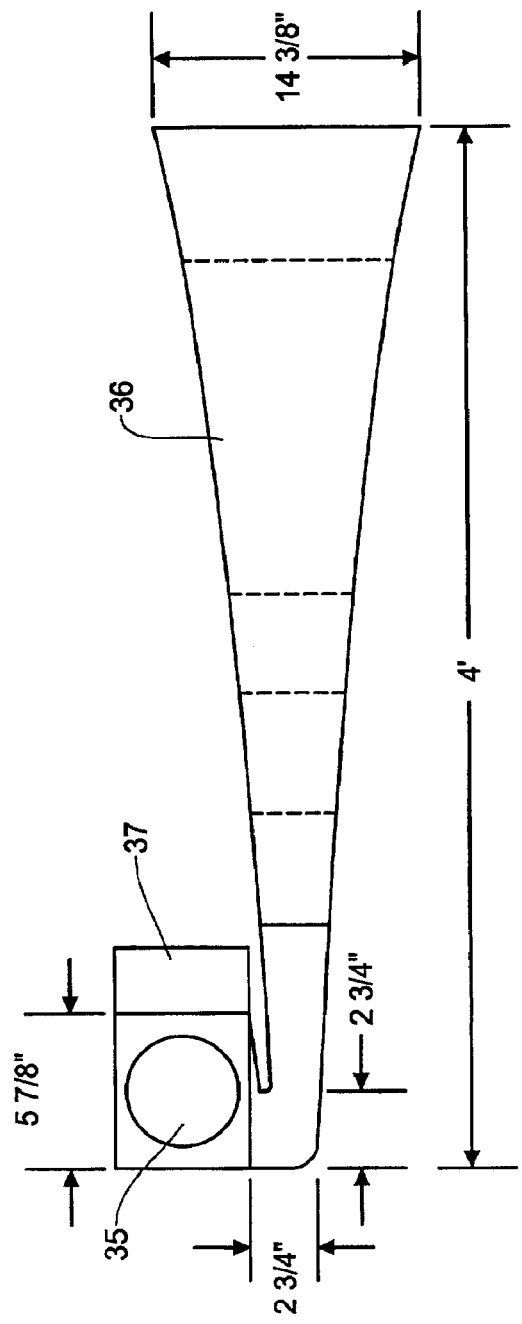

The detailed structure of the sub-woofer system of the present invention is shown in FIGS. 10A and 10B. FIG. 10A is a side view of the sub-woofer system of the present invention and FIG. 10B is a top view of the sub-woofer system. The drawings show examples of size and shape of the sub-woofer system for illustration purposes only. Various other sizes and shapes are possible within the concept of the present invention. An example of the drive unit is a 5.25" loudspeaker which is relatively small for the sub-woofer, however, because the flat horn 36 guides the sound wave without loss to the fire wall, sufficient sound volume is produced by the sub-woofer system. Preferably, a cover 37 is provided over the drive unit 35 50 that the sound wave generated by the drive unit 35 is efficiently guided only toward the flat horn 36.

FIGS. 11A and 11B show another example of the sub-woofer system of the present invention where FIG. 11A is a side view thereof and FIG. 11B is a top view thereof. In this example, the flat horn 36 is straight throughout in the side view. In this structure, the end opening of the flat horn 36 will be positioned at the lower end of the fire wall of the vehicle. It is assumed that the vehicle for this sub-woofer system has no transversal pillar at the mounting area of the sub-woofer system.

Figure 12A:
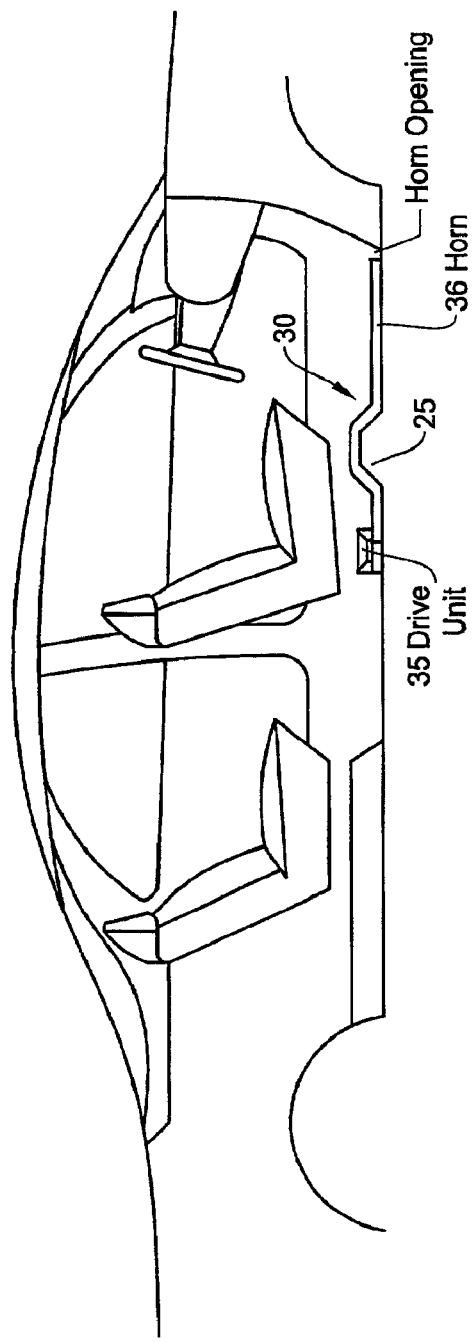
FIG. 12A is a schematic diagram showing another example of sub-woofer system of the present invention where the flat horn is formed with use of the chassis of the vehicle and FIG. 12B is a perspective view of the cover forming the flat horn when mounted on the chassis of the vehicle.
Figure 12B:
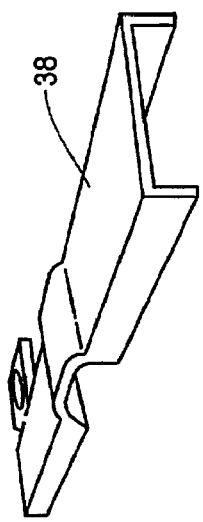

FIG. 12 is a side view of another embodiment of the present invention. In this example, the flat horn 36 is formed by utilizing the floor of the vehicle. Namely, the lower plate of the flat horn 36 is made of the chassis of the vehicle while a cover (upper plate and side walls) 38 of the flat horn 36 is attached to the chassis of the vehicle. FIG. 12B is a perspective view of the cover 38 of the flat horn to be attached to the floor of the vehicle. Alternatively, the flat horn 36 is integrally formed of the chassis of the vehicle at the very beginning of producing the body of the vehicle.

Figure 13A:
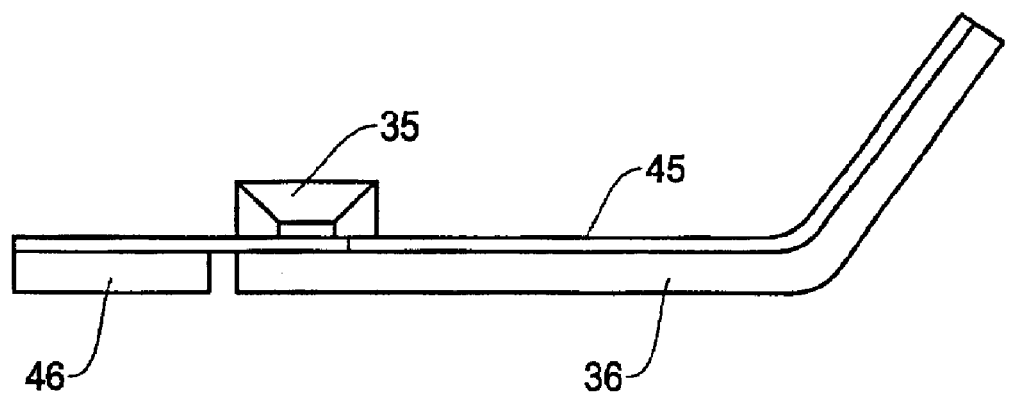
FIGS. 13A and 13B are schematic diagrams showing a further example of sub-woofer system of the present invention where the flat horn is attached to the floor mat of the vehicle, where
Figure 13B:
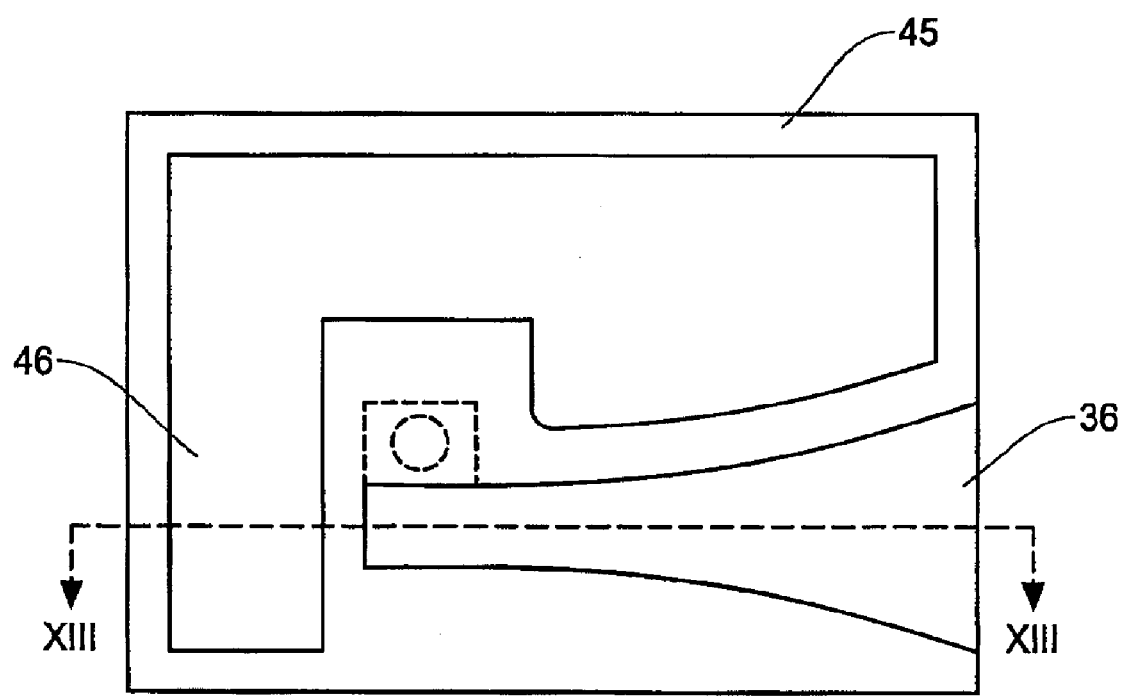

FIGS. 13A and 13B are schematic diagrams showing a further example of sub-woofer system of the present invention where the flat horn is attached to the floor mat of the vehicle. FIG. 13A is a side view of the flat horn bonded to the carpet and FIG. 13B is a bottom view thereof. In this example, it is conveniently designed so that the sub-woofer system is mounted on the vehicle by a dealer of the vehicle or a user. Since the sub-woofer system, especially, the flat horn is prefabricated with the floor mat, a dealer or a user can easily install the sub-woofer system in the vehicle. It is also possible to integrally establish the carpet (floor mat) and the flat horn. In such an application, it may be necessary to include additional ribs in the horn for enforcement.

In the cross sectional side view of FIG. 13A, a carpet 45 and the flat horn 36 are fixed together through an adhesive, for example, in a manner that the ends of the carpet 45 and the flat horn 36 are flush with one another. In this way, because the end opening of the flat horn is not inadvertently covered by the carpet, it is able to avoid any muffle sound. To maintain the flatness of the carpet 45, a spacer 46 is provided which is substantially the same thickness of the flat horn 36. The bottom view of FIG. 13B provides an example of shape of the flat horn 36 and the spacer 46. Many other variations of the shape and size of the horn and spacer will be possible within the concept of the present invention.

As has been described above, according to the present invention, the sub-woofer system for a vehicle is capable of achieving improved sound reproducing performance by introducing the sound output at the fire wall of the vehicle while mounting the flat horn on the floor. Because the drive unit is located under the front seat and the flat horn is placed on the floor under the carpet, the sub-woofer system is established without sacrificing any space in the vehicle. In the sub-woofer system of the present invention, the flat horn can be prefabricated with a floor mat of the vehicle for easy installation in the vehicle. Further, the flat horn of the sub-woofer system can be formed as a part of the floor chassis of the vehicle.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A sound reproducing system for use in a vehicle, comprising:
   a drive unit for producing sound in response to an electric signal provided thereto; and
   a horn having rectangular cross-section and formed with a proximal end and a distal end where the proximal end is connected to the drive unit for guiding the sound produced by the drive unit, the horn being substantially uniform in thickness throughout while gradually increasing in width toward the distal end;
   wherein the drive unit is positioned under a front seat of the vehicle and the horn is placed on a floor of the vehicle, and wherein an end opening of the horn at the distal end thereof is positioned close to a front wall of a passenger compartment of the vehicle so that at least a part of the distal end contacts with the front wall.

2. A sound reproducing system as defined in claim 1, wherein the distal end of the horn is curved or bent upwardly along the front wall of the passenger compartment of the vehicle.

3. A sound reproducing system as defined in claim 1, wherein the distal end of the horn is straight.

4. A sound reproducing system as defined in claim 1, wherein the horn has an upwardly curved portion in an intermediate portion thereof to match a transversal pillar of the vehicle.

5. A sound reproducing system as defined in claim 1, wherein at least a bottom plate of the horn is established by a chassis of the vehicle.

6. A sound reproducing system as defined in claim 1, wherein the horn is integrally formed by a chassis of the vehicle.

7. A sound reproducing system as defined in claim 1, wherein the horn is attached to a floor carpet of the vehicle through an adhesive where the end opening of the horn and an end edge of the floor carpet are flush with one another.

8. A sound reproducing system as defined in claim 7, wherein a spacer is provided on the floor carpet to maintain the same thickness of the floor carpet when installed in the vehicle.

9. A sound reproducing system as defined in claim 1, wherein the horn is integrally formed with a floor carpet of the vehicle where the end opening of the horn having rectangular cross-section and an end edge of the floor carpet are flush with one another.

10. A sound reproducing system as defined in claim 9, wherein a spacer is provided on the floor carpet to maintain the same thickness of the floor carpet when installed in the vehicle.

* * * * *